Figure 1:
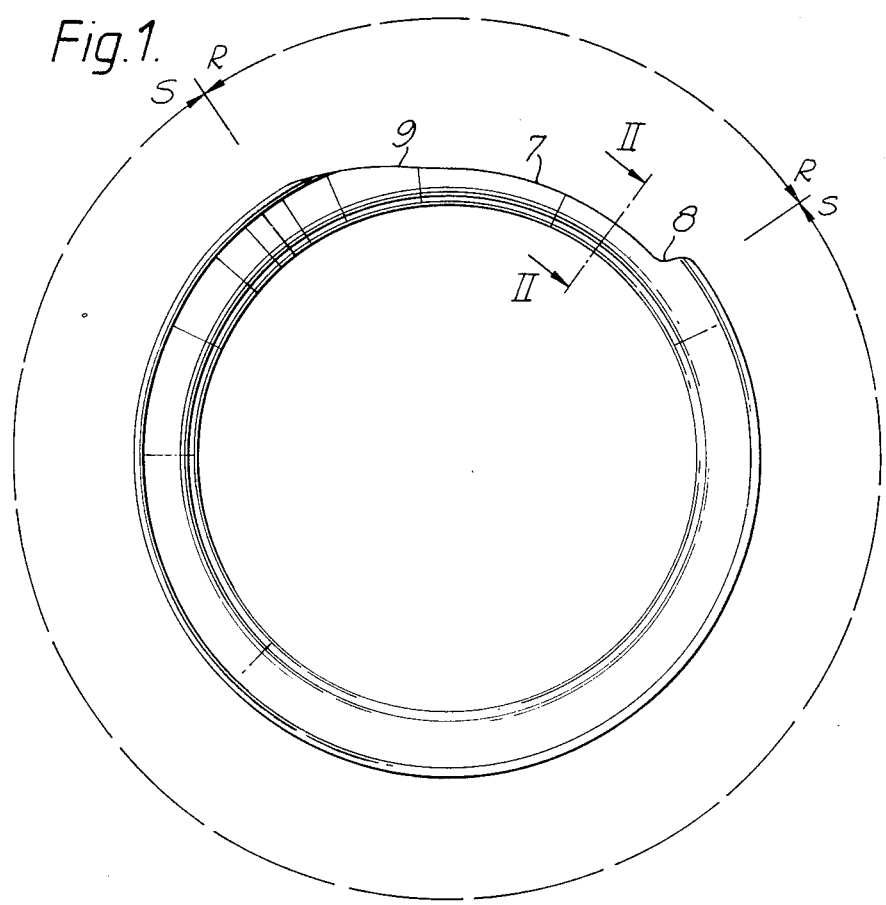

United States Patent [19]

Kemp

[11] Patent Number: 4,976,498

[45] Date of Patent: Dec. 11, 1990

[54] WHEEL RIM FOR A PNEUMATIC TIRE

[75] Inventor: Ian Kemp, Wilnecote, England

[73] Assignee: Sumitomo Rubber Industries, Limited, Kobe, Japan

[21] Appl. No.: 330,176

[22] Filed: Mar. 29, 1989

[30] Foreign Application Priority Data

Mar. 30, 1988 [GB] United Kingdom ................ 8807509

[51] Int. Cl.⁵ .............................................. B60B 21/10
[52] U.S. Cl. ....................................... 301/95; 152/375
[58] Field of Search ....................... 301/95, 96, 97, 98; 152/379.3, 379.4, 379.5, 381.3, 381.4

[56] References Cited

U.S. PATENT DOCUMENTS

| 1,689,649 | 10/1928 | Wagenhorst . |
| 1,693,192 | 11/1928 | Colgrove . |
| 2,164,984 | 7/1939 | Brink . |
| 4,773,711 | 9/1988 | Griffiths et al. . |
| 4,836,260 | 6/1989 | Corner et al. ........................ 152/375 |

FOREIGN PATENT DOCUMENTS

| 2645760 | 4/1978 | Fed. Rep. of Germany . |
| 534003 | 3/1922 | France . |
| 254251 | 1/1927 | France . |
| 672929 | 2/1930 | France . |
| 16939 | of 1913 | United Kingdom . |

Primary Examiner—Russell D. Stormer
Attorney, Agent, or Firm—Birch, Stewart, Kolasch & Birch

[57] ABSTRACT

A one piece wheel rim for a pneumatic tire having flanges adjacent to tapered bead seats one of the flanges having a reduced high portion of a length of 0.25 to 0.5 times the bead seat circumference. The reduced height portion being in the range of 0.15 to 0.6 times the height of the remainder of the flange, which construction allows a tire to be fitted to the rim without the necessity for a conventional tire fitting well.

10 Claims, 2 Drawing Sheets

WHEEL RIM FOR A PNEUMATIC TIRE

This invention relates to a wheel rim for a pneumatic tire and in particular to a single piece wheel rim having two axially spaced tapered bead seats on which a tire may be mounted.

It relates in particular to a wheel rim of the type disclosed in co-pending European Patent Application No. 88300557.1 which corresponds to U.S. Pat. No. 4,836,260, where a one piece wheel rim is provided having a pair of axially spaced apart tapered bead seats, tire retaining flange located axially outwards of each bead seat and characterised by one flange having a reduced height portion having a length of 0.25 to 0.5 times the bead circumference and the reduced height portion being such that the flange height, measured from the heel point, which is the point of intersection of the nominal diameter and the nominal wheel width, is in the range of 0.15 to 0.6 times the height of the remainder of the flange to allow tire fitting.

The wheel rim of this prior invention may in some circumstances cause chafing of the tire in the bead region adjacent to the cut-away portion of the flange, and it is one object of the present invention to provide a wheel rim of one piece construction which has all the advantages of the previous application but which in addition avoids chafing of the tire bead adjacent to the cut-away region.

According to one aspect of the present invention a one piece wheel rim for a pneumatic tire is provided having a pair of axially spaced apart tapered bead seats, a tire retaining flange located axially outwards of each bead seat, said flange being in its radially inner region at an angle of A degrees to the radial direction of the wheel and being characterised by having a reduced height portion having a length of 0.25 to 0.5 times the bead seat circumference and the reduced height being such that the flange height, measured from the heel point, which is the point of intersection of the nominal diameter and the nominal wheel width is in the range of 0.15 and 0.6 times the height of the remainder of the flange, wherein the portion of the flange which is radially outside the reduced height portion is at an angle B degrees where angle B is greater than angle A to the radial direction so that a tire bead fitted to the wheel rim seats against the flange only to the height of the reduced height portion around the full circumference of the tire.

Preferably the angle B of the radially outer portion of the wheel rim is substantially greater than angle A; for example angle B when measured from the radial direction is preferably in the range of 10 to 75 degrees and more preferably in the range of 60 to 70 degrees.

The overall height of the flange, measured in the radial direction, is preferably similar to the flange height used in a conventional rim.

The resultant assembly, in having the flange cut-away, still allows the wheel to have only a minimal fitting well which is of substantially smaller depth than a normal wheel rim well and thus the wheel rim allows for a greater brake volume than for a conventional wheel rim. As in the case of the previous invention the minimal fitting well may be circumferentially continuous or indeed in some preferred arrangements may be very short in the circumferential direction. The minimal well may comprise only a flat connecting base between the axially inner edges of the tapered bead seats so that in fact the wheel appears to have no well whatsoever.

The reduced height portion of the flange has limited effective thickness so that it projects in the axial direction of the wheel rim only a short distance from the tyre bead contacting flange face. This is to ensure that the necessary skew of the tire as it is fitted with part of the bead in the shallow well does not cause even the reduced height portion to abnormally tension the bead reinforcement on assembly of the tire to the wheel rim.

The reduced height portion, where it joins the portion sloping at angle B, may be smoothly radius from one portion to the other or may have a progressively rising region which has its surface at the angle B but which gradually rises in height until the full flange extension B is provided. Preferably one end of the cut-away portion projects suddenly to the full flange shape at the angle B and at the other end of the cut-away there is a progressive gradual slope in the portion of the flange at angle B.

Further aspects of the present invention will become apparent from the following description of one embodiment of the invention in conjunction with the attached diagrammatic drawings in which:

FIG. 1. shows a side view of a wheel rim according to the present invention.

Figure 2:
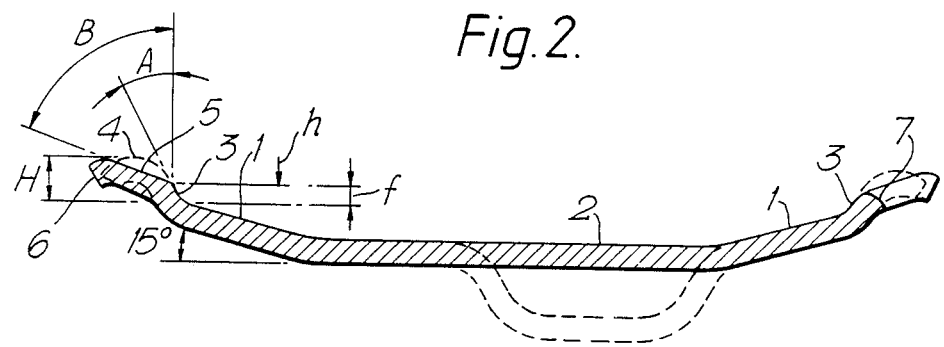

FIG. 2. shows a partial cross section of the wheel rim taken on the line II in FIG. 1.

Figure 3:
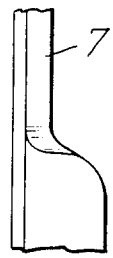

FIG. 3. is a plan view taken in the direction of arrow X on FIG. 2.

Figure 4:
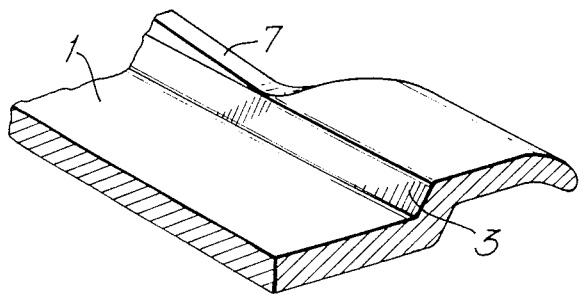

FIG. 4. is a perspective scrap view of the flange at one end of the cut-away region in FIGS. 1 and 2.

Figure 5:
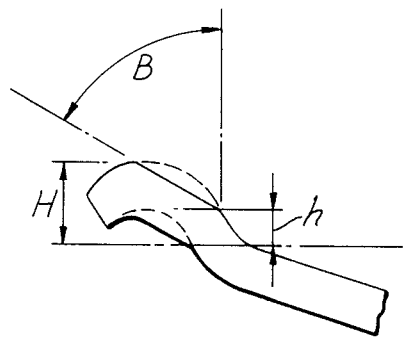
Figure 6:
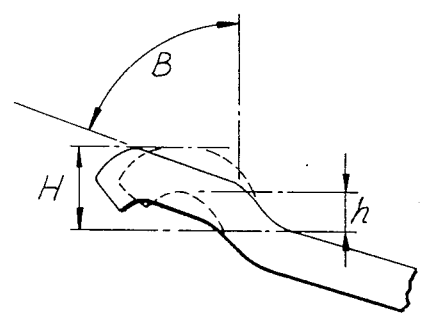

FIGS. 5 and 6 show alternative flange shapes to the embodiment of FIG. 1.

The primary embodiment of FIGS. 1, 2, 3, and 4 is a 22.5 inch diameter truck wheel rim having a pair of tapered bead seats 1, each at an angle of 15 degrees to the axial direction of the wheel rim and a central flat web 2 interconnecting the axially inner edges of the tapered bead seats 1. Each bead seat has at its outer end a tire retaining flange 3 which is at an angle A to the radial direction of the wheel rim. The angle A is in this case 20 degrees as used on all such 22.5 inch one piece truck wheel rims.

The height of the tapered flange 3, measured in the radial direction is indicated by dimension S and this height is 12 mm. The conventional flange shape for a 22.5 inch rim is shown by the broken line 4, and this has a height of 12.7 mm. However, as can be seen the present wheel rim has the axially outermost portion 5 formed at a second angle B to the radial direction. In this embodiment angle B is 60 degrees and the radially outer surface of the flange 5 continues at this angle of 60 degrees until the conventional flange height H of 12.7 mm is reached whereupon the flange has a small turnover portion 6.

Both flanges of the wheel rim have this same shape. The inner flange, or back flange is, however, modified as can clearly be seen in FIGS. 1 and 2 in that it includes a reduced height portion 7. The reduced height portion comprises a cutting away of the portion of the flange which is at angle B so that for a part of the circumference of the wheel rim the region 5 does not exist. The cut-away portion 7 thus has an effective flange height of 6 mm and this extends around the circumference of the wheel rim for a distance RR which means that the flange around the remainder of the wheel rim marked by the region SS is of the full flange size. One end of the cut-away flange has a steeply rising region 8 and the other end of the cut-away portion has a gradually rising region 9. The cut-away portion has a length of 0.5 times the circumference of the wheel rim (although in FIG. 1 it is shown shorter for reasons of clarity).

The wheel takes a conventional 22.5 inch radial tubeless truck tire and the tire can be fitted in a similar manner to conventional assembly except that the tire must be positioned so that when the bead is engaged in the very shallow well between the two tapered bead seats the other side is at the reduced flange portion. Thus to use levers to complete bead fitting entails levering the bead over the reduced height portion and this can advantageously be done by taking advantage of the steeply rising portion 8. Tire removal or stripping is the same procedure and the tire can be removed from the wheel rim without difficulty.

Similar constructions of wheel rim may be used for cars and other heavy vehicles and it is not essential for the bead seats to be tapered at the 15 degree angle described. In fact a similar assembly can be used for all size wheel rims from small cars to heavy trucks.

The wheel rim has all the advantages of the originally mentioned European Patent Application in the name of the applicants but in addition the present wheel rim has a constant height, tire contacting flange 3 around the full circumference of both wheel rim flanges and the higher portions of the flanges 5 do not normally contact the tire. Thus the tire is not subject to chafing at the edges of the cut-away region but the remainder of the flanges in the regions SS are of the same height as conventional flanges and thus provide the conventional degree of safety in the event of tire dislodgement following a puncture.

Having now described my invention what I claim is:

1. A one piece wheel rim for a pneumatic tire comprising:
   a pair of axially spaced apart tapered bead seats; and
   a tire retaining flange located axially outwards of each bead seat, said flange being in its radially inner regions at an angle of A degrees with respect to the radial direction of the wheel and having a reduced height portion of a length of 0.25 to 0.5 times the bead seat circumference and the reduced height being such that the flange height, measured from the heel point, which is the point of intersection of the nominal diameter and the nominal wheel width, is in the range of 0.15 to 0.6 times the height of the remainder of the flange, wherein the portion of the flange which is radially outside the reduced height portion is at an angle B degrees wherein the angle B is greater than angle A with respect to the radial direction so that a tire bead fitted to the wheel rims seats against the flange only to the height of the reduced height portion around the full circumference of the tire.

2. A one piece wheel rim according to claim 1 wherein the angle B of the radially outward portion of the wheel rim is substantially greater than angle A.

3. A one piece wheel rim according to claim 2 wherein the angle B is in the range of 10 to 75 degrees.

4. A one piece wheel rim according to claim 1 wherein the angle B is in the range of 60 to 70 degrees.

5. A one piece wheel rim according to claim 1 wherein a minimal well is provided comprising a flat connecting base between the axially inner edges of the tapered bead seats.

6. A one piece wheel rim according to claim 1 wherein the reduced height portion of the flange has a limited effective thickness so that it projects in the axial direction of the wheel rim a distance from the tire bead contacting flange face such that any distortion, and hence the any tension, in the tire bead during the fitting of the tire on the wheel rim is minimized.

7. A one piece wheel rim according to claim 1 wherein the reduced height portion, where it joins the portion sloping at an angle B, is smoothly radiused from one portion to the other.

8. A one piece wheel rim according to claim 1 wherein the angle A is 20 degrees.

9. A one piece wheel rim according to claim 1 wherein the portion of the flange which is radially outside the reduced height portion and is at an angle of B degrees is substantially flat.

10. A one piece wheel rim according to claim 1 wherein the reduced weight portion, where it joins the portion sloping at an angle B, has a progressively rising region which gradually rises in height to form the tire retaining flange.

* * * * *